Patented Dec. 1, 1953

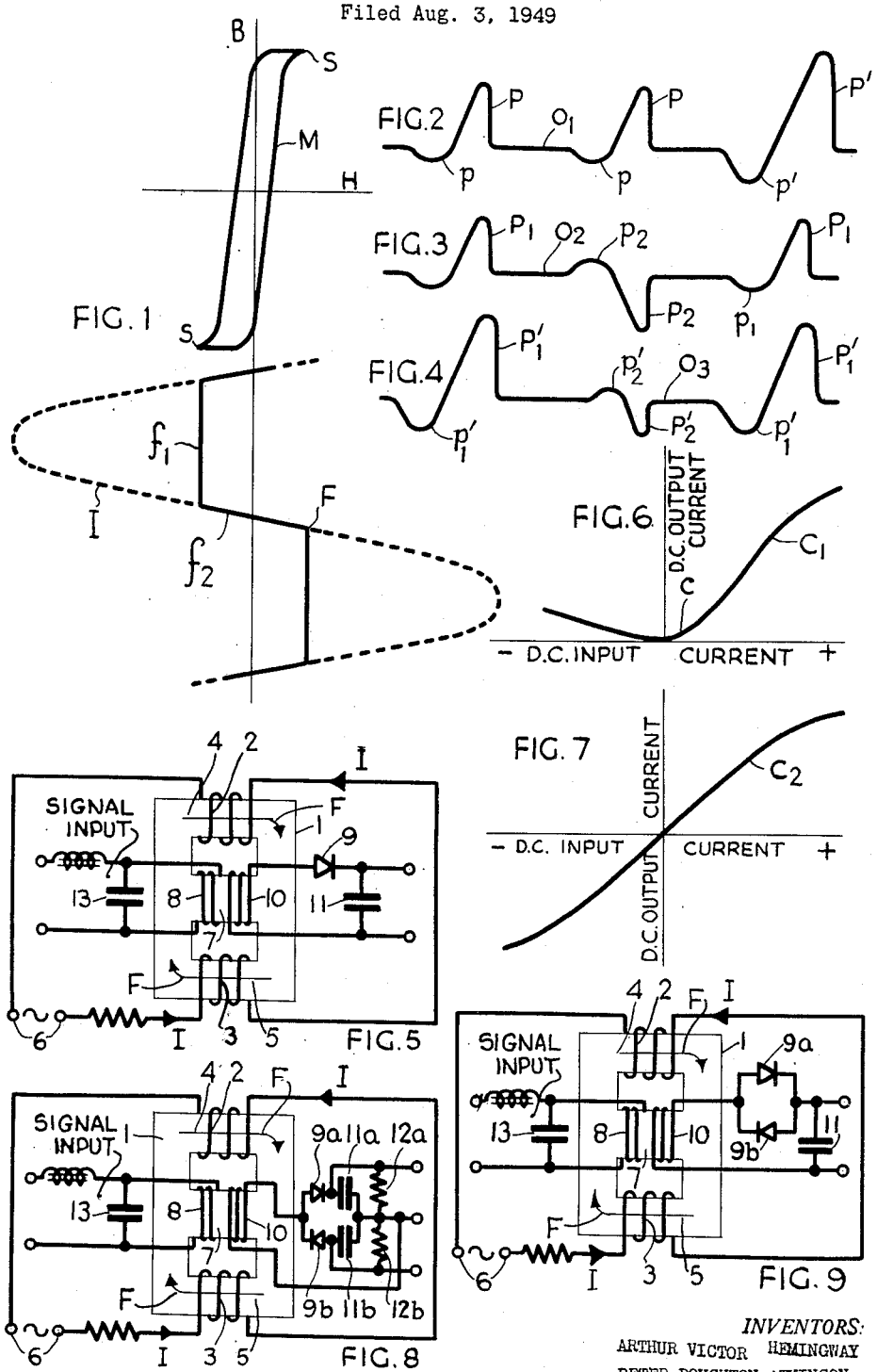

2,661,453

UNITED STATES PATENT OFFICE 2,661,453

SATURABLE CORE TRANSFORMER SYSTEM

Arthur Victor Hemingway, Boreham Wood, and Peter Doughton Atkinson, Radlett, England Application August 3, 1949, Serial No. 108,404

Claims priority, application Great Britain January 3, 1949

2 Claims. (Cl. 323—56)

This invention consists in a method of and apparatus for producing electric power outputs from weak magnetic fields. The power produced may be employed for controlling electrical apparatus. The weak magnetic field may be produced by a winding embracing a magnetic core of the apparatus and supplied with weak electric currents, in which case the apparatus will produce an amplified electric power output. The apparatus according to the invention has a relatively wide range of applications, and one example which may be cited is the control of the switching of street lamps in accordance with the daylight intensity. Another application is in geological survey systems for the predetermination of the presence of minerals in the earth's crust from aerial recording of variations in the earth's magnetic field, whilst a still further application is to the detection and measurement of the ionisation resulting from the passage of a flame between two insulated electrodes.

It is already known to energise a highly permeable magnetic core with alternating fields of opposite phase and of equal magnitude having a peak value slightly in excess of the saturation value for the core, so that the flux wave in the core due to either field acting alone has a flat top, subjecting a part of the core in which the resultant flux due to the two alternating fields is zero to a unidirectional flux which is proportional to a D. C. signal to be amplified, and deriving a pulsed electrical output from the resultant field such that the amplitude of each pulse is proportional to the D. C. signal to be amplified, and using the said pulsed output to operate a controlled device. Such an apparatus, however, has the disadvantage that the output is proportional to the voltage of the source supplying the current to produce the alternating fields, and requires a stabilised supply. Furthermore there is negligible power in the output without the use of an A. C. amplifier such as a thermionic valve.

The present invention has for an object to provide apparatus for amplifying weak unidirectional signals in which the output is independent of fluctuations of supply voltage and is capable of operating apparatus such as a sensitive D. C. relay or galvanometer without further amplification.

According to the present invention, a method of producing electric power output from a weak magnetic field comprises energising a magnetic circuit of a highly permeable material with alternating fields of similar wave form in phase opposition and having peak values greatly in excess of the saturation value for the material of the magnetic circuit over the greater part of each half cycle so that the waveform of the flux produced in the magnetic circuit by each field is substantially straight between successive positive and negative maxima, applying the weak magnetic field to a portion of the magnetic circuit in which the said alternating fields oppose each other, and generating in a winding magnetically interlinked with the said portion of the magnetic circuit a resultant output current.

The weak magnetic field may be produced by an input winding embracing the portion of the magnetic circuit in which the alternating fields oppose each other and supplied with weak electric currents. In this case an amplified electric power output is produced.

According to a feature of the present invention, the magnetic circuit is unbalanced under conditions of zero signal input so as to cause alternate positive and negative pulses to be generated in an output winding interlinked with the flux in that part of the magnetic circuit in which the energising fluxes oppose each other, and the said winding is connected to an output circuit comprising an element having a non-linear voltage/current characteristic and a reservoir condenser connected in series therewith.

The unbalance of the magnetic core may be produced by reducing the cross-section of one of the limbs of the core carrying the energising windings compared with the other; or the numbers of turns on the two energising windings may be different. In a still further modification an impedance may be connected across one of the energizing windings. Any other method of unbalancing the magnetic circuit may be adopted as desired.

By working the magnetic core over most of the energizing flux cycle well above the saturation value, a pulsed electrical output is obtained in which the pulse voltage over the working range of the apparatus can be made large enough to work a metal or like static rectifier satisfactorily. The energy contained in each pulse can then be integrated by means of a reservoir condenser connected across the rectifier output and a D. C. power output is obtained which is directly proportional to the energy of the D. C. input signal.

The invention also envisages the provision of an apparatus for carrying out the method set out above comprising a highly permeable magnetic circuit having two energising windings thereon each to be connected to an alternating current source in such a way that the fluxes produced by the said windings oppose each other in a portion of the magnetic circuit, and the windings being such that the fields produced by them in the magnetic circuit have peak values greatly in excess of the saturation value for the material of the magnetic circuit over the greater part of each half cycle so that the waveform of the flux produced in the magnetic circuit by each field is substantially straight between successive positive and negative maxima, said portion of the magnetic circuit being adapted to be subjected to the weak magnetic field, and an output winding surrounding the said portion of the magnetic circuit.

Advantageously, the output winding may be connected to a rectifier and smoothing circuits for producing a D. C. output power.

The output circuit may comprise a pair of oppositely connected metal or like static rectifiers, feeding a common or a respective reservoir condenser, the output being taken across the or each condenser.

To enable the invention to be more readily understood various embodiments thereof will now be described by way of illustration only with reference to the accompanying drawings in which:

Fig. 1 shows typical magnetisation, energising current, and corresponding magnetic flux curves of an apparatus according to the invention;

Figs. 2-4 indicate typical output waveforms of the apparatus;

Fig. 5 is a circuit diagram of one form of apparatus;

Fig. 6 shows an input/output characteristic for an apparatus as shown in Fig. 5 in which the energising fluxes are equal in magnitude;

Fig. 7 shows an input/output characteristic where the energising fluxes are of unequal magnitudes; and Figs. 8 and 9 show alternative circuit arrangements of the apparatus shown in Fig. 5.

Throughout the figures of the drawings like parts carry like reference characters.

In the construction of apparatus shown in Fig. 5, a three-limbed core 1 of high permeability iron, such as Mu-metal, has alternating current windings 2, 3 on each of the outer limbs 4, 5 respectively. These windings 2, 3 have the same number of turns, and are oppositely wound and connected in series to an alternating current source 6.

The hysteresis loop M (Fig. 1) of the iron of the core 1 is very narrow and nearly parallel to the B axis, and the circuit is arranged so that the windings 2, 3 have an M. M. F. of about 1 ampere turn per inch, this value being greatly in excess of the saturation value ($s$ in Fig. 1) for the iron of the core so that the flux wave F in each outer limb 4, 5 thereof has a flat top $f_1$ extending over the greater part of each half cycle, whilst the portions $f_2$ extending between successive positive and negative maxima are substantially straight. Hence, a very small displacement of the zero of the exciting alternating flux F corresponding to a weak unidirectional field applied to the centre limb 7 of the core 1, causes the out-of-balance flux in the said limb to be in the form of a pulse such as P in the waveform $O_1$ in Fig. 2 at each reversal of sign of the energising fluxes, said out-of-balance flux pulse P being of a value comparable with or equal to the saturation value of the magnetic material of the core.

The weak unidirectional field may be produced by a weak D. C. signal applied to a D. C. input winding 8 (Fig. 5) on the centre limb 7 of the core 1 and the area of the out-of-balance flux pulse P is proportional to the magnitude of the D. C. signal to a degree of accuracy dependent on the closeness of the approximation of each half wave of energising flux F to a trapezium. At a critical value of D. C. signal, the flux pulse P (Fig. 2) reaches saturation value for the material of the core, and any increase in the strength of the D. C. signal above this critical value does not increase the height of the pulse but expands its width, as shown at $P_1$ in Fig. 2.

The circuit is arranged so that it works at a value of pulse height P (Fig. 2) which is selected so that a metal or like rectifier 9 (Fig. 5) connected to an output winding 10 can be operated efficiently. The apparatus is then suitable for the amplification of weak D. C. signals so as to produce an output power suitable for directly operating a D. C. apparatus such as a sensitive electro-magnetic relay or a galvanometer (not shown).

Where the apparatus of Fig. 5 is operated under conditions of balanced energising fluxes in the outer limbs 4, 5 of the magnetic core 1 the characteristic of the apparatus is of the form shown at $C_1$ in Fig. 6. As will be seen, this curve exhibits a bend $c$ in the region of the origin and is tangential to the input axis. This departure from linearity of the characteristic $C_1$ is due to two main factors, viz:

(i) For very small currents the rectifier element 9 has a non-linear characteristic and a relatively high resistance in the conducting direction;

(ii) The hysteresis loop M of the iron has a finite curvature in the region of the saturation value at $s$, Fig. 1, producing a diminution in sensitivity of the magnetic circuit for very small pulses.

In some instances, the input signal may be of such magnitude that the bend $c$ in the characteristic $C_1$ may be neglected for all practical purposes. In other applications, however, this bend may constitute an undesirable limitation, since for very small inputs the sensitivity is markedly reduced, and becomes zero in the limiting case.

In order to overcome this disadvantage, the energising fluxes in the outer limbs 4, 5, of the magnetic core 1 may be unbalanced so that the current in the output winding 10 consists of alternate positive and negative pulses. When the apparatus is operated in this manner, and there is no input signal to the input winding 8 on the centre limb 7 of the core 1 the waveform of the current in the output winding 10 is as shown at $O_2$ in Figure 3, the positive and negative pulses $P_1$ $P_2$ respectively being of equal magnitudes. When, however, a signal is applied to the input winding 8, the flux produced thereby in the centre limb 7 alters the existing unbalance of the exciting fluxes in the said limb in a sense dependent on the sign of the input signal. Thus, assuming that the input signal in a given instance is positive, the output waveform becomes as shown in Fig. 4, the positive pulses being increased in magnitude, as at $P_1'$, whilst the negative pulses are decreased as at $P_2'$. If the input signal is negative, the negative pulses $P_2'$ are increased and the positive pulses $P_1'$ decreased. The response characteristic of the apparatus then becomes as shown at $C_2$ in Fig. 7, from which it will be seen that the sensitivity is constant over the full working range of the apparatus both at and on either side of the origin.

In order to take advantage of the ability of the apparatus when operated under conditions of unbalance of the exciting fluxes, to discriminate between positive and negative input signals, it is preferred to modify the output circuit connected to the output winding 10 in the manner shown in Fig. 8 or Fig. 9. In the circuit shown in Fig. 8, two single rectifier elements 9a, 9b respectively are connected in series with equal condensers 11a and 11b, having equal load resistances 12a, 12b respectively connected across them so that positive and negative current pulses $P_1'$, $P_2'$ are passed into different condensers. Thus, if the input to the winding 8 is zero, equal charges appear on condensers 11a and 11b and the leakage currents in the resistances 12a and 12b are equal. If then an input signal is applied to the winding 8, the current in say, the resistance 12a increases and the current in the resistance 12b decreases (or vice versa depending on the polarity of the input signal). The difference between the currents in the resistances 12a and 12b is proportional to the input signal level and its polarity depends on the polarity of the input signal.

In the circuit shown in Fig. 9 a single condenser 11 is connected in series with two rectifier elements 9a, 9b connected in parallel so that they conduct in opposite directions. Thus the condenser 11 is alternately charged positive and negative. Now if the input to the winding 8 is zero and the positive and negative current pulses $P_1$, $P_2$ are equal, the net charge on the condenser 11 is zero. If, however, an input signal is applied to the winding 8, a resultant charge appears across the condenser 11 which is proportional to the input signal level and has a polarity dependent on the polarity of the input signal.

The two circuits shown in Figs. 8 and 9 give very good zero stability since any variations in conditions which affect both rectifier elements 9a, 9b in the same way (e. g. ambient temperature changes) will produce only a very small output (if any) when the input signal is zero.

A further improvement in stability can be obtained by replacing the two asymmetrical elements 9a, 9b by a single element having a non-linear voltage current characteristic which is symmetrical about zero voltage. Examples of elements having suitable characteristics are those made of materials sold under the trade names Thyrite and Metrosil. The advantage of using this type of element is that its characteristic is much more symmetrical than is normally obtainable by connecting a pair of asymmetrical rectifier elements in parallel, as at 9a, 9b in Figs. 8 and 9. As a result, the apparatus is more easily balanced and is even more stable against aging of components and changes in ambient temperature.

Due to the change of flux in the limb 7 when a unidirectional signal is applied to the winding 8, an asymmetrical alternating potential is induced in both the signal and output windings 8, 10 and consists of a pair of pulses of opposite sign which occur at every reversal of the exciting flux produced by the A. C. energising windings 2, 3. Due to the shape of the magnetisation loop M (Fig. 1) of the material of the magnetic circuit, the pulses of each pair differ in size, the first pulse P (Figs. 2-4) being of relatively small magnitude but of correspondingly longer duration compared with the second pulse P. Only the larger pulse P of each pair of pulses is material in providing the power fed to the output circuit owing to the shape of the voltage/current characteristic of the rectifier or other non-linear element 9 in the output circuit. This pairing of the output pulses can be utilised to obtain the required minimum value of output potential for efficient operation of the non-linear element 9 from a weaker input signal, thus in effect increasing the gain of the apparatus. If, then, a condenser 13 is connected across the signal winding 8 of the apparatus, or any winding inductively coupled thereto, having a capacity such that the said winding 8 is tuned to resonance, with a natural period approximating to the period of time occupied in one reversal of the energising flux from the positive to the negative saturation value of the magnetic circuit, the small pulse P will operate to initiate self-oscillation of the tuned circuit 8, 13 such that the energy of self-oscillation is added to the succeeding larger pulse P and the gain of the apparatus is increased. This increase of gain enables the rectifier or other non-linear element 9 in the output circuit to be worked at an efficient part of its characteristic by weak signals which would otherwise be too small to produce the required output voltage. This effect is obtained whether or not the energising fluxes are of equal magnitude.

What we claim is:

1. Apparatus for producing an electrical power output representative of the value of a direct current signal having a given maximum value, comprising a saturable core of a high permeability magnetic material providing a pair of magnetic circuits each including a common part of said core, a winding encircling said common core part and supplied with said signal, said winding having so few turns that said maximum signal value will not magnetically saturate the material in said core part, a second winding linking one of said magnetic circuits and adapted when energised with alternating current to produce a first alternating magnetic flux in said common core part, a third winding linking the other of said magnetic circuits and adapted when energised with alternating current to produce a second alternating magnetic flux in said common core part, said second and third windings each containing so many turns that when the respective energising currents exceed a given intensity said alternating magnetic fluxes will each have positive and negative peak values greatly exceeding the saturation value of the material in said common core part, means for supplying a first alternating current of an intensity exceeding said given intensity to said second winding, means for supplying to said third winding a second alternating current of an intensity exceeding said given intensity, the combination of said one magnetic circuit with said second winding energised by said first alternating current being arranged to produce in said common core part a first alternating magnetic flux having positive and negative peak values of a different magnitude from the positive and negtaive peak values of the second alternating magnetic flux produced in said common core part by the combination of said other magnetic circuit with said third winding energised by said second alternating current, said first and second alternating currents being in phase with each other but supplied in such senses that said first and second alternating fluxes oppose each other in said common core part, a fourth winding encircling said common core part to have an electric pulse output generated therein by changes in flux density in said core part, and electric pulse-utilizing means connected to receive the output from said fourth winding.

2. Apparatus for producing an electrical power output representative of the value of a direct current signal having a given maximum value, comprising a saturable core of high permeability magnetic material, an input winding encircling said core, means for supplying said direct current signal to said input winding to produce a magnetic field in said core directed parallel with the length of the same, said input winding containing so few turns that said signal cannot produce a field equalling the saturation value of said material of said core, means for producing longitudinally in said core two opposed unequal magnetic fields each alternating between positive and negative peak values greatly in excess of the saturation value of said material and having their respective zero values substantially coincident in time, means adapted to tune said input winding to resonance at a natural frequency having a period substantially equal to the period of one reversal of said magnetic fields between successive positive and negative peak values, an output winding inductively coupled with said core to have an electric pulse output generated therein by changes in flux density in said core part, and electric pulse-utilising means connected to receive said output.

ARTHUR VICTOR HEMINGWAY.
PETER DOUGHTON ATKINSON.

References Cited in the file of this patent

UNITED STATES PATENTS

| Number | Name | Date |
| --- | --- | --- |
| 2,053,154 | La Pierre | Sept. 1, 1936 |
| 2,481,644 | Callaway | Sept. 13, 1949 |